April 27, 1965 J. I. MOSS ETAL 3,180,338

ELECTRONIC MUSCLE STIMULATOR

Filed Jan. 6, 1961

Inventors.
John I. Moss.
Mitchell I. Kohn

By Hofgren Brady, Wegner,
Allen & Stellman
Attorneys

3,180,338
ELECTRONIC MUSCLE STIMULATOR

John I. Moss, Skokie, and Mitchell I. Kohn, Wheeling, Ill., assignors to Relaxacizor, Inc., a corporation of California Filed Jan. 6, 1961, Ser. No. 81,072
3 Claims. (Cl. 128—422)

This invention relates to an electronic apparatus for generating electrical signals particularly designed for stimulating muscle activity.

It is well known that certain types of electrical impulses may be utilized for stimulating muscle action to achieve and maintain muscle tone and to eliminate soft, flabby body tissue. This invention relates to a novel simplified circuit for producing improved electrical pulses, which achieves these results safely and efficiently.

A principal object of the invention is to provide a simplified transistorized circuit for generating muscle stimulating signals. Another object is to provide an electronic muscle stimulator including an electronic timing oscillator, a blocking oscillator, series connected with the timing oscillator through a battery producing a bias voltage which renders the blocking oscillator inoperative, said timing oscillator periodically overcoming the bias voltage to render the blocking oscillator operative, and output means connected with the blocking oscillator for utilizing the oscillator pulses in the stimulation of muscle fibers.

A further object is to provide such a device in which the power circuit of the blocking oscillator includes a reactive element and a diode that provides for a gradual increase of the amplitude of the pulses at the start of the oscillator operating period.

Yet another object is to provide such a device in which the output circuit is directly connected to the transistor blocking oscillator by a step-up transformer.

Another object is to provide a cord assembly for connecting the output of the device to a muscle applicator pad that has a built-in voltage divider which reduces the amplitude of the pulses from the output of the blocking oscillator. Such a cord assembly should have indicia thereon indicating a special use, as for facial treatment where reduced amplitude pulses are desirable.

Further objects and advantages will become apparent from the following detailed description taken in connection with the accompanying drawings in which.

Figure 1:
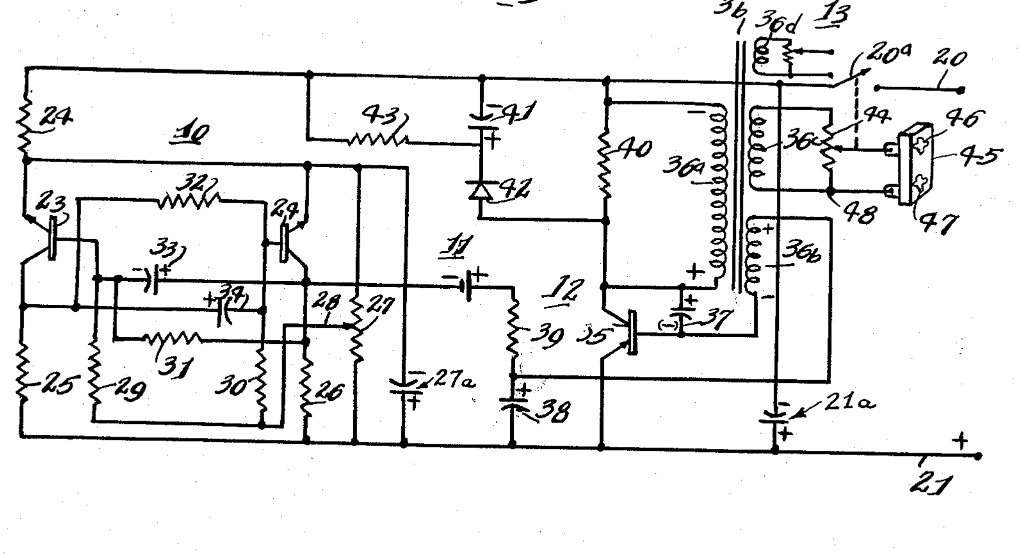
FIG. 1 is a schematic drawing of a muscle stimulator embodying the invention.

While this invention is susceptible of embodiments in many different forms, there is shown in the drawings and will herein be described in detail a preferred embodiment of the invention with the understanding that the present disclosure is to be considered as an exemplification of the principles of the invention and is not intended to limit the scope to the embodiment illustrated. The scope of the invention will be pointed out in the appended claims.

Muscle stimulators of the general character disclosed herein are gaining increasingly wide acceptance for home use. The signals generated not only stimulate and exercise the muscles improving tone and reducing flab, but also have a relaxing effect on the user, reducing tension from worry, overwork and the like. One problem with previous apparatus is that it includes electronic circuits energized from a 110 volt standard service circuit and incorporates high voltage electronic tubes. The pads or devices which are applied to the body transmit generated pulses to the muscles must be moistened to improve the contact conductivity with the body, while such apparatus is perfectly safe, a great deal of consumer resistance is encountered as a result of the fear of electrical shock. The novel system disclosed herein is a simplified transistor circuit operating at a relatively low voltage which produces an improved muscle stimulating pulse and also allays the fears of technically uneducated users regarding the safety of the device.

Turning now to FIG. 1 of the drawings, the apparatus includes a transistor timing oscillator or multivibrator 10 which controls the operation of a transistor blocking oscillator or pulse generator 12, the output of which is directly connected through a step-up transformer to a pair of load circuits 13. The pulses appearing in the load circuits are applied to appropriate muscles actuating points of the user, through a cord assembly that is connected to an applicator pad that is secured to the body. Various types of applicator pads of different sizes and shapes are available for stimulating different muscles.

The circuit of FIG. 1 and its operation, will now be described in some detail, and the values and type designations will be given to many of the circuit elements. It is to be understood that these specific figures are given primarily for the purpose of disclosing an operative embodiment of the invention, and the values are not to be considered critical. Many changes and modifications will be readily apparent to those skilled in the art.

The circuit is energized from a suitable source, as 24 volts D.C. with the indicated polarity, connected to terminals 20 and 21, the power circuit being provided with an off-on switch 20*a*. Capacitor 21*a* is a filter and decoupling capacitor connected between terminal 21 and power switch 20*a*. The timing oscillator 10 includes a pair of npn transistors 23 and 24, each a 2N306, having their emitter electrodes connected together and through a resistor 24, 2200 ohms, to the power lead 20. The collector elements of the transistors are returned, through resistors 25 and 26, respectively, each 2200 ohms, to the power lead 21. A potentiometer 27, 5000 ohms, is connected between the emitter electrodes of the transistors and the power lead 21 and is bypassed by capacitor 27*a* and has a center tap 28 that is connected to the base electrodes of the transistors 23 and 24 through resistors 29, 56,000 ohms, and 30, 82,000 ohms, respectively. A resistor 31, 22,000 ohms, connects the base electrode of the transistor 23 to the collector of transistor 24, and a resistor 32, 15,000 ohms, connects the base of the electrode of the transistor 24 to the collector of transistor 23. A capacitor 33, 16 $\mu$f. (microfarad), is shunted across the resistor 31, and a capacitor 34, 16 $\mu$f., is shunted across the resistor 32.

The blocking oscillator 12 comprises a pnp transistor 35, as type 2N1129, having an emitter electrode connected to the power lead 21 and a collector electrode connected through the primary winding 36*a* of a step-up transformer 36, to the power lead 20. A feed back winding 36*b* of transformer 36, has one terminal connected with the base electrode of the transistor 35 and also through a capacitor 37, .05 $\mu$f. to the collector of transistor 35. The other terminal of feed back winding 36*b* is connected through a capacitor 38, 2.0 $\mu$f. to the power lead 21.

A bias battery 11 comprising a small 1½ volt D.C. battery has its negative terminal connected to the collector of the timing oscillator transistor 24 and its positive terminal connected through a resistor 39, 3900 ohms, and the feed back winding 36*b* to the base electrode of transistor 35.

The positive bias voltage applied to the base element of transistor 35 by the battery 11 keeps the blocking oscillator inoperative. The bias voltage is overcome periodically by the negative half of the timing signal from the timing oscillator 10, and turns on the blocking oscillator. As the transistor 35 begins to conduct, the change of current in the primary winding 36*a* induces a current in winding 36*b* which feeds back to the transistor 35 providing a repeated pulse type oscillation. The potentiometer 27 provides an adjustment to vary the pulse width and repetition rate of the timing signal from the timing oscillator 10. A resistor 40, 1000 ohms, shunts the primary winding 36*a*, damping the oscillations, and preventing a damaging reverse potential from being applied to the collector of transistor 35.

When the timing oscillator turns on the blocking oscillator, it is undesirable for the pulses to abruptly reach a maximum amplitude since some users develop a fear of impending stimulation and the desirable relaxing effect is not achieved. A gradual increase in the amplitude of pulses upon initiation of the blocking oscillator cycle is extremely effective in conditioning the user to the stimulation.

A loading circuit of the blocking oscillator 12 includes a large capacitor 41, 100 μf., connected in series with a transistor diode 42, as a 1N1561, and the series is shunted across the primary winding 36*a* of transformer 36. A resistor 43, 5600 ohms, is shunted across the capacitor 41 from the juncture capacitor 41 and diode 42 to the power lead 20. When the transistor 35 begins to conduct, capacitor 41 tends to charge through diode 42 along an exponential curve, the slope of which is determined by the relative values of the capacitor and the impedance of the charging circuit. The time constant of the charging circuit should be large with respect to the period of the blocking oscillator and the value of the capacitor 41 should be such that five to ten pulses of the blocking oscillator are required to completely charge the capacitor. The charging circuit provides a high initial loading for the blocking oscillator and as a result, the amplitude of the pulses from blocking oscillator 12 increases gradually at the start of the operative period of the oscillator. When the blocking oscillator is inoperative, the capacitor 41 discharges through resistor 43.

In operation, the timing oscillator 10 produces a self-sustaining oscillation upon the closing of switch 20*a*. The positive potential on the base element of the blocking oscillator transistor 35 which is supplied from the positive terminal of the bias battery 11 is sufficient to prevent the transistor 35 from conducting and no pulsed oscillation is produced across the primary winding 36*a*. When the negative half of the timing signal from timing oscillator 10 is present, the positive bias potential on the base electrode is overcome and transistor 35 conducts for the duration of the negative portion of the timing signal producing a pulsed oscillation across the primary winding 36*a*. The positive half cycle of the timing output signal supplements the positive bias potential on the base electrode of transistor 35 and renders the blocking oscillator inoperative. The blocking oscillator has a duty cycle of about 50 percent, providing the desired pulsed output for approximately ¾ of a second and no output (a rest period) for ¾ of a second. The duty cycle and rest period are varied by the potentiometer 27 in the timing oscillator circuit which changes the pulse width and repetition rate of the timing oscillator output.

The output from the blocking oscillator is coupled directly from the primary winding 36*a* of the transformer 36, which contains 100 turns of wire to a secondary winding 36*c* containing 600 turns. The step-up transformer 36 permits output direct from the oscillator to be applied at an increased amplitude across a load potentiometer 44, 4000 ohms, which is shunted across the secondary winding 36*c*. An output receptacle 45 has one of its terminals 46 connected to the center tap of the potentiometer 44 and the other terminal 47 connected to a terminal 48 of the potentiometer. A secondary winding 36*d* of the transformer 36, similar to the winding 36*c* provides another output circuit for the blocking oscillator. The center tap of the potentiometer 44 may be adjusted by the operator to vary the amplitude of the oscillator pulses coupled through the receptacle 45 and a cord assembly (not shown) to an applicator pad that is applied to the body.

For certain types of application, a relatively lower voltage is necessary since full voltage applied to the face, for example, would make the user uncomfortable. A special cord assembly is provided with a built-in voltage divider network and carries special indicia to indicate the purpose thereof.

Figure 2:
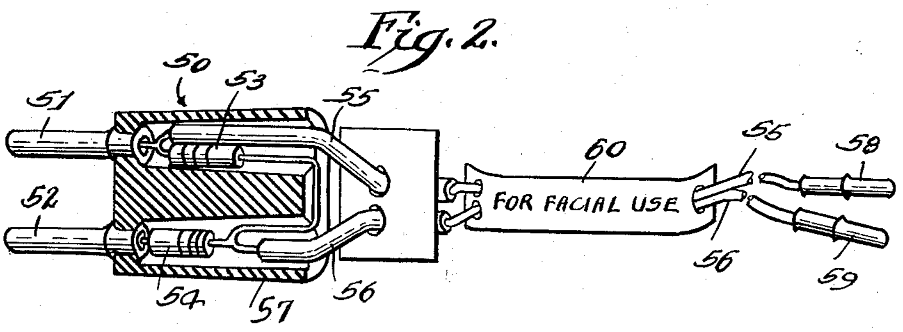
FIG. 2 is a partial cross-sectional view of an embodiment of the cord assembly.

FIGURE 2 shows a cord assembly for connecting the output of the electronic muscle stimulator at the receptacle 45 to a muscle applicator pad that is applied to the body. The particular cord assembly shown is for facial use, and has a voltage divider network built into its assembly that limits the voltage applied to the face to a desired low level without any adjustment on the part of the operator. The embodiment comprises a plug 50 having terminal jacks 51 and 52 for connection with the output receptacle 45. Resistors 53 and 54 are series connected across the terminal jacks 51 and 52 and a pair of wires 55 and 56 are connected across one of the resistors 53. The entire assembly is encased in a suitable insulating material 56 with the jacks 51 and 52 extending outwardly therefrom. The wires 55 and 56 terminate with a pair of plugs 58 and 59 for connection to a facial applicator pad. A special indicia strip 60 is affixed to the wires 55 and 56 to indicate the assembly is for a special use, such as facial use.

Figure 3:
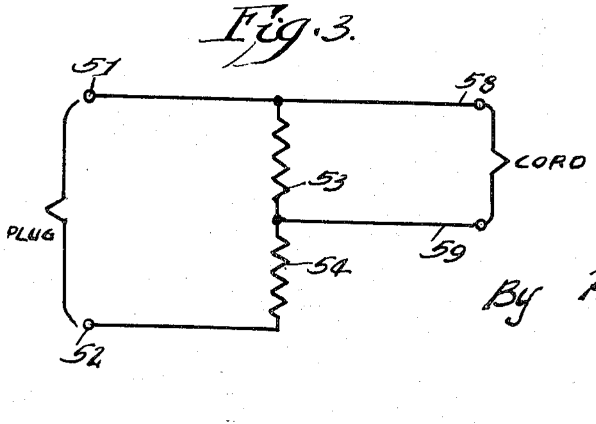
FIG. 3 is a schematic diagram of the cord assembly.

FIGURE 3 is a schematic diagram of the cord assembly showing the voltage divider network. The values of the resistors 53 and 54 are 2200 ohms and 1500 ohms, respectively, and provide a pulse amplitude at the applicator pad that will give sufficient stimulation for the facial muscles and yet be low enough to prevent undesirable effects.

We claim:

1. Electronic means for generating electrical signals for muscle stimulation, comprising: an electric timing oscillator; a pulse generator having a power circuit; a direct circuit connection between said timing oscillator and said pulse generator, said timing oscillator periodically rendering said pulse generator operative and inoperative; and means including a reactive element and a diode in the power circuit of said pulse generator, providing a high initial loading to give a gradual increase in the amplitude of a pulse in the output of the pulse generator at the start of the operative cycle thereof.

2. Electronic stimulator means for generating electrical signals for muscle stimulation, comprising: an electric timing oscillator; a pulse generator having a power circuit; a direct circuit connection between said timing oscillator and said pulse generator, said timing oscillator periodically rendering said pulse generator operative and inoperative; and means including a diode in series with the parallel combination of a capacitor and a resistor in the power circuit of said pulse generator providing a high initial loading to give a gradual increase in the amplitude of a pulse in the output of the pulse generator at the start of the operative cycle.

3. An electronic muscle stimulator for generating electrical signals for the muscle stimulation of sensitive areas of the body, such as facial regions, comprising:

(*a*) a transistorized multivibrator having an output, (*b*) a transistorized blocking oscillator having a control element, (*c*) a circuit connection between the multivibrator and the oscillator including a source of D.C. potential for normally biasing the oscillator into an inoperative state, the output of the multivibrator periodically overcoming the biasing effect of the source and rendering the oscillator operative, (*d*) a variable output circuit connected to the oscillator for supplying a stimulatory output signal, and (*e*) a cord assembly having special indicia thereon and including a voltage dividing network connected across the output circuit for reducing the amplitude of the oscillator output, the voltage dividing network including a pair of series connected resistors and a pair of output leads connected across one of the resistors, whereby said reduced output is especially adapted for the stimulation of sensitive areas of the body without causing undue discomfort to the patient.

References Cited by the Examiner

UNITED STATES PATENTS

| | | | |
|---|---|---|---|
| 2,004,751 | 6/35 | Fischer | 128—423 X |
| 2,294,411 | 9/42 | Lay | 128—423 |
| 2,379,884 | 7/45 | Crosse | 128—423 X |
| 2,473,378 | 6/49 | Liberson | 128—421 |
| 2,498,882 | 2/50 | Fizzell | 128—2.1 |
| 2,532,788 | 12/50 | Sarnoff | 128—421 X |
| 2,590,216 | 3/52 | Schuhfried | 128—422 |
| 2,622,200 | 12/52 | Hodgson | 128—423 X |
| 2,664,880 | 1/54 | Wales | 128—24.1 |
| 2,668,540 | 2/54 | Browner | 128—423 |
| 2,771,554 | 11/56 | Gratzl | 128—421 |
| 2,850,648 | 9/58 | Elliott | 128—421 X |
| 3,025,858 | 3/62 | Browner | 128—422 |
| 3,050,695 | 8/62 | Du Vall | 128—419.1 X |
| 3,057,356 | 10/62 | Greatbatch | 128—422 |
| 3,109,430 | 11/63 | Tischler | 128—422 |

FOREIGN PATENTS 64,718 6/55 France.
(first addition to 1,083,425)

OTHER REFERENCES

O. B. Sneath, "Electronic Stimulators," pages 129–132, of Wireless World, April 1949.

L. Molyneux, "A Transistor Cardiotachometer," pages 125–127 of Electronic Engineering, March 1957.

Erickson and Bryant, "Electrical Engineering," 1959.

Pettit, "Electronic Switching," 1959, p. 4.

Sarbach, "Encyclopedic Dictionary of Electronics," 1959.

RICHARD A. GAUDET, *Primary Examiner.*

HAROLD B. WHITMORE, RICHARD J. HOFFMAN, LOUIS R. PRINCE, *Examiners.*